United States Patent
Fujita

(10) Patent No.: US 6,178,039 B1
(45) Date of Patent: Jan. 23, 2001

(54) LIGHT SOURCE MODULE AND AN OPTICAL AMPLIFIER USING THE SAME

(75) Inventor: Masayuki Fujita, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/256,289

(22) Filed: Feb. 24, 1999

(30) Foreign Application Priority Data

Feb. 25, 1998 (JP) .................................................. 10-042706

(51) Int. Cl.$^7$ ........................................................ H01S 3/00
(52) U.S. Cl. ............................................ 359/341; 359/345
(58) Field of Search ..................................... 359/341, 345

(56) References Cited

U.S. PATENT DOCUMENTS

| | | | | |
|---|---|---|---|---|
| 5,163,058 | * | 11/1992 | Farries et al. ............................ | 372/6 |
| 5,177,562 | * | 1/1993 | Wysocki et al. ....................... | 356/350 |
| 5,940,425 | * | 8/1999 | Lasser et al. ........................... | 372/72 |
| 5,973,808 | * | 10/1999 | Sekimura et al. ..................... | 359/124 |

FOREIGN PATENT DOCUMENTS

| | | | |
|---|---|---|---|
| 0 634 844 A1 | * | 1/1995 | (EP) . |
| 42-24269 | | 11/1942 | (JP) . |
| 57-68940 | | 4/1982 | (JP) . |
| 61-80114 | | 4/1986 | (JP) . |
| 3-159182 | | 7/1991 | (JP) . |
| 3-179430 | | 8/1991 | (JP) . |
| 4-73706 | | 3/1992 | (JP) . |
| 4-345102 | | 12/1992 | (JP) . |
| 5-21874 | | 1/1993 | (JP) . |
| 5-100260 | | 4/1993 | (JP) . |
| 5-82881 | | 4/1993 | (JP) . |
| 5-327101 | | 12/1993 | (JP) . |
| 6-5955 | | 1/1994 | (JP) . |
| 6-260711 | | 9/1994 | (JP) . |
| 7-231131 | | 8/1995 | (JP) . |
| 7-297468 | | 11/1995 | (JP) . |
| 9-148660 | | 6/1997 | (JP) . |
| 9-289503 | | 11/1997 | (JP) . |
| WO 97/39460 | * | 10/1997 | (WO) . |
| WO 99/276619 | * | 6/1999 | (WO) . |

OTHER PUBLICATIONS

Japanese Office Action, dated Jun. 6, 2000, with partial translation.

* cited by examiner

*Primary Examiner*—Mark Hellner
(74) *Attorney, Agent, or Firm*—McGinn & Gibb, PLLC

(57) ABSTRACT

A light source module and an optical amplifier which uses this light source module, for which internal oscillation within the optical fiber and the resultant destabilization of the amplifying operation is prevented by lowering the reflection factor for the light of the same wavelength band as the signal light. An optical filter film coating at the end face of the optical fiber reflects the light of the signal light band to be amplified, and the filter film transmits the pumping light. The end face of the optical fiber is polished on a slant, whereby the reflected light is emitted to the outside of the core of the optical fiber. As a result, the reflection factor of the light of the signal light band to be amplified in the inside of the core of the optical fiber is reduced compared with a conventional optical fiber simply polished on a slant. Further, light supplied to the rare-earth doped fiber from the light source becomes the substantial pumping light, resulting in stable amplification.

12 Claims, 3 Drawing Sheets

LIGHT SOURCE MODULE AND AN OPTICAL AMPLIFIER USING THE SAME

BACKGROUND OF THE INVENTION

The present invention recites a light source module and an optical amplifier which uses the light source module for optical communication and optical information processing.

DESCRIPTION OF THE RELATED ART

In a long distance optical fiber communication system, an optical relay is needed to amplify the light signal attenuated in an optical fiber being used as a transmission line. In an optical relay, there is an optical fiber amplifier which directly amplifies light using a rare-earth doped optical fiber as the amplification media. This optical fiber amplifier has a pumping light source module which causes the rare-earth doped optical fiber pump to produce the optical amplification. The pumping light from the pumping light source module and a signal light to be amplified are multiplexed at a WDM (Wavelength Division Multiplexer). The multiplexed pumping light and signal light are then transmitted to the rare-earth doped optical fiber. This system is called a forward pumping system.

There is also another system called the backward pumping system. In this system, the signal light to be amplified is input at one end of the rare-earth doped optical fiber with the pumping light source module connected at the other end of the rare-earth doped optical fiber via a WDM. The amplified signal light is output via this WDM. In order to produce stable amplification with a rare-earth doped optical fiber, the reflection factor of optical components connected to the input and output parts of the rare-earth doped optical fiber must be kept low when the signal light to be amplified and the light of the rare-earth doped optical fiber are the same wavelength. A large reflection factor leads to an oscillation inside the rare-earth doped optical fiber, and the amplifying operation may become unstable. Therefore, in the pumping light source module, it is advantageous to have a low reflection factor at the proximal end of the optical fiber.

In a conventional pumping light source module, the end of the optical fiber is polished on a slant to reduce reflection. The light to be amplified is reflected between the end of the optical fiber and the pumping light source element. An optical filter which enables the coupling of pumping light is inserted on a slant to the light axis.

At the pumping light source module, where the polished end of the optical fiber is on a slant, the reflection of the pumping light source element is unavoidable. The conventional method to avoid reflection of the end face of the pumping light source is to insert an optical isolator between the end of the optical fiber and the pumping light source element. The optical isolator reflects the light to be amplified. The disadvantage to the optical isolator is the loss of a few dB at the 980 nm band wavelength, which is a main pumping wavelength of the Er (erbium) doped optical fiber. The reduction in signal makes it difficult to transmit sufficient pumping light power to the optical fiber.

FIG. 1 is a block diagram showing the construction of a conventional optical fiber used for optical multiplex transmission. The Japanese Patent Laid-Open SHO 57-68940 discloses the structure of the optical fiber for optical multiplex transmission, as illustrated in FIG. 1. As shown in FIG. 1, an optical fiber 17, with both ends slanted at a 45° angle and polished as a light axis, transmits the plural wavelengths of light. Interference filter films 16 and 20 are positioned on the slanted end of the optical fiber, reflecting the light of wavelength λ 1, and allowing the transmission of λ 2. This structure enables one end of the optical fiber to transmit, and the other end to receive.

At the transmitting end, a luminous element 14 generating the light of the wavelength λ 1 is positioned at a right angle to the light axis of the optical fiber 17. A luminous element 15 generating the light of the wavelength λ 2 is positioned parallel to the light axis of the optical fiber 17. At the receiving end, a light receiving element 18 receives the light of the wavelength λ 1, which is reflected by the interference filter film 20, positioned at a right angle to the light axis of the optical fiber 17, and a light receiving element 19 is positioned parallel to the light axis of the optical fiber 17 to receive the light of the wavelength λ 2 transmitted through the interference filter film.

The light of the wavelength λ 1 generated by the luminance element 14 is totally reflected by the interference film 16 and is transmitted to the optical fiber 17. The light of the wavelength λ 2 generated by the luminance element 15 is transmitted through the interference filter film 16 and on to the optical fiber 17. As a result, both lights are multiplexed with one another. As the light is transmitted through the optical fiber 17, the light of the wavelength λ1 is totally reflected off to light receiving element 18, and the light of the wavelength λ 2 transmits through the interference filter film 20 to reach the light receiving element 19. As a result, both lights are separated from one another.

In the technology of the Japanese Patent Laid-Open Application No. SHO 57-68940, only the structure of the optical fiber for the optical multiplex transmission is disclosed. The above-mentioned problem of optical amplification using a rare-earth doped optical fiber is not addressed.

SUMMARY OF THE INVENTION

The object of the present invention is to provide a light source module and an optical amplifier which uses the light source module, for which internal oscillation within the optical fiber and the resultant destabilization of the amplifying operation is prevented by lowering the reflection factor for the light of the same wavelength band as the signal light.

Accordingly, in a first embodiment of the present invention, a light source module provides a light source element which outputs the light of the pumping wavelength of a rare-earth doped optical fiber. An optical fiber with the receiving end polished on a slant receives the outputted light from the light source element. An optical filter film provided at the receiving end of the optical fiber allows the outputted light from the light source element provided at the end of the optical fiber to penetrate, and causes the light of the amplification band wavelength of the rare-earth doped optical fiber to reflect.

In a second embodiment of the present invention, the rare-earth doped optical fiber of the first embodiment is an Er (erbium) doped optical fiber. The pumping wavelength is 1480 nm band and the amplification band wavelength is 1550 nm band.

In a third embodiment of the present invention, the rare-earth doped optical fiber of the first embodiment is an Er (erbium) doped optical fiber. The pumping wavelength is 980 nm band and the amplification band wavelength is 1550 band.

In a fourth embodiment of the present invention, the rare-earth doped optical fiber of the first embodiment is a PR (praseodymium) doped optical fiber. The pumping wavelength is 1016 nm band and the amplification band wavelength is 1300 nm band.

In a fifth embodiment of the present invention, an optical amplifier supplies the pumping light to a rare-earth doped optical fiber, and amplifies an inputted signal light. The amplifier provides a light source element which outputs the light of the pumping wavelength of said rare-earth doped optical fiber. The rare-earth doped optical fiber has a slanted end face for receiving the outputted light from the source element. An optical filter enables the transmission of the outputted light from the light source element and the reflection of the inputted signal light. An optical coupler transmits the pumping light from the other end face of optical fiber for pumping the rare-earth doped optical fiber.

In a sixth embodiment of the invention, the optical coupler of the fifth embodiment is situated at the input end of the rare-earth doped optical fiber, and is set up to multiplex the inputted signal light and the pumping light.

In a seventh embodiment of the invention, the optical coupler of the fifth embodiment is situated at the output end of the rare-earth doped optical fiber, and is set up to separate the inputted signal light and the pumping light.

In the present invention, all of the light of the signal light band is amplified, except for the pumping light input from an optical fiber, which is reflected by an optical filter film coating the end face of the optical fiber. The end face of the optical fiber is polished on a slant. As a result, the reflected light becomes an emission mode and is emitted to the outside of the core of the optical fiber. The end face of the optical fiber is polished on a slant, whereby the reflected light is emitted to the outside of the core of the optical fiber. As a result, the reflection factor of the light of the signal light band to be amplified in the inside of the core of the optical fiber is reduced compared with a conventional optical fiber simply polished on a slant. Further, light supplied to the rare-earth doped fiber from the light source becomes the substantial pumping light, resulting in stable amplification.

BRIEF DESCRIPTION OF THE DRAWINGS

The invention is illustrated in the accompanying drawings, in which.

DETAILED DESCRIPTION OF PREFERRED EMBODIMENTS OF THE INVENTION

Figure 1:
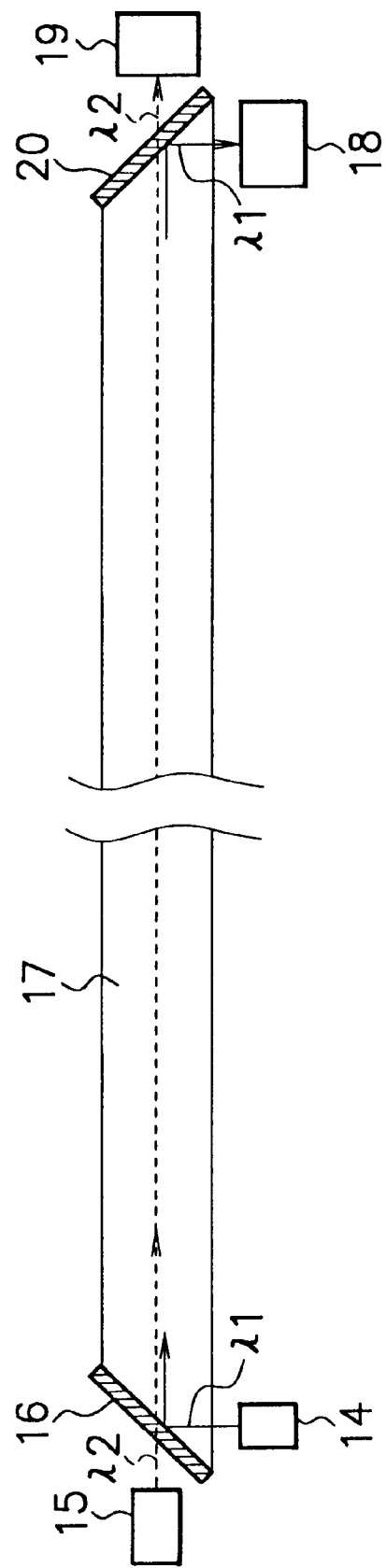
FIG. 1 is a block diagram showing the construction of the conventional optical fiber for the optical multiplex transmission.
Figure 2:
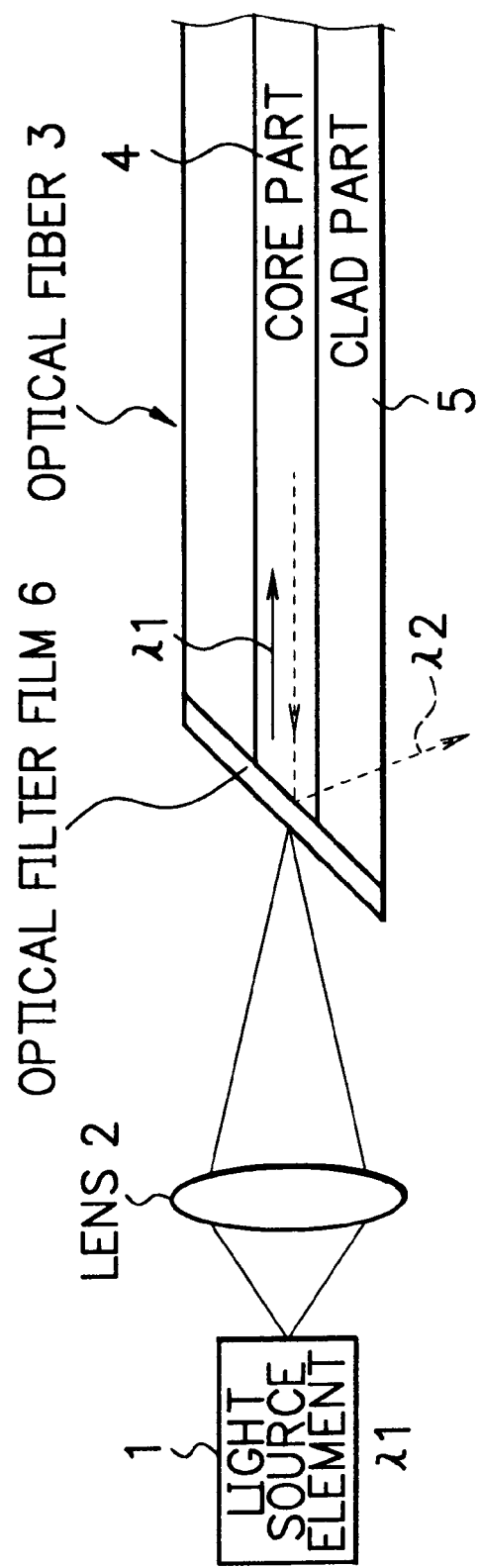
FIG. 2 is a block diagram showing an embodiment of a light source module of the present invention.

Referring now to the drawings, and more particularly to FIG. 2, there are shown preferred embodiments of the method and structures according to the present invention. In FIG. 2, a light source element 1, generating pumping light for a rare-earth doped optical fiber (not shown in FIG. 2), generates the pumping light of the wavelength $\lambda$ 1. This pumping light is condensed at a lens 2, and introduced to the end face of a single mode optical fiber 3. The end face of the single mode optical fiber 3 is polished on a slant at, for example, an angle of 8° to the normal axis line of a core part 4.

This polished surface is coated with an optical filter film 6. The pumping light of wavelength $\lambda$ 1 from the light source element 1 transmits through this optical filter film 6, and the light of the amplifying wavelength band $\lambda$ 2 of the rare-earth doped optical fiber is reflected. Optical filter film 6 is a dielectric multilayer film formed by a method such as vapor evaporation. A clad part 5 covers the core part 4.

Figure 3:
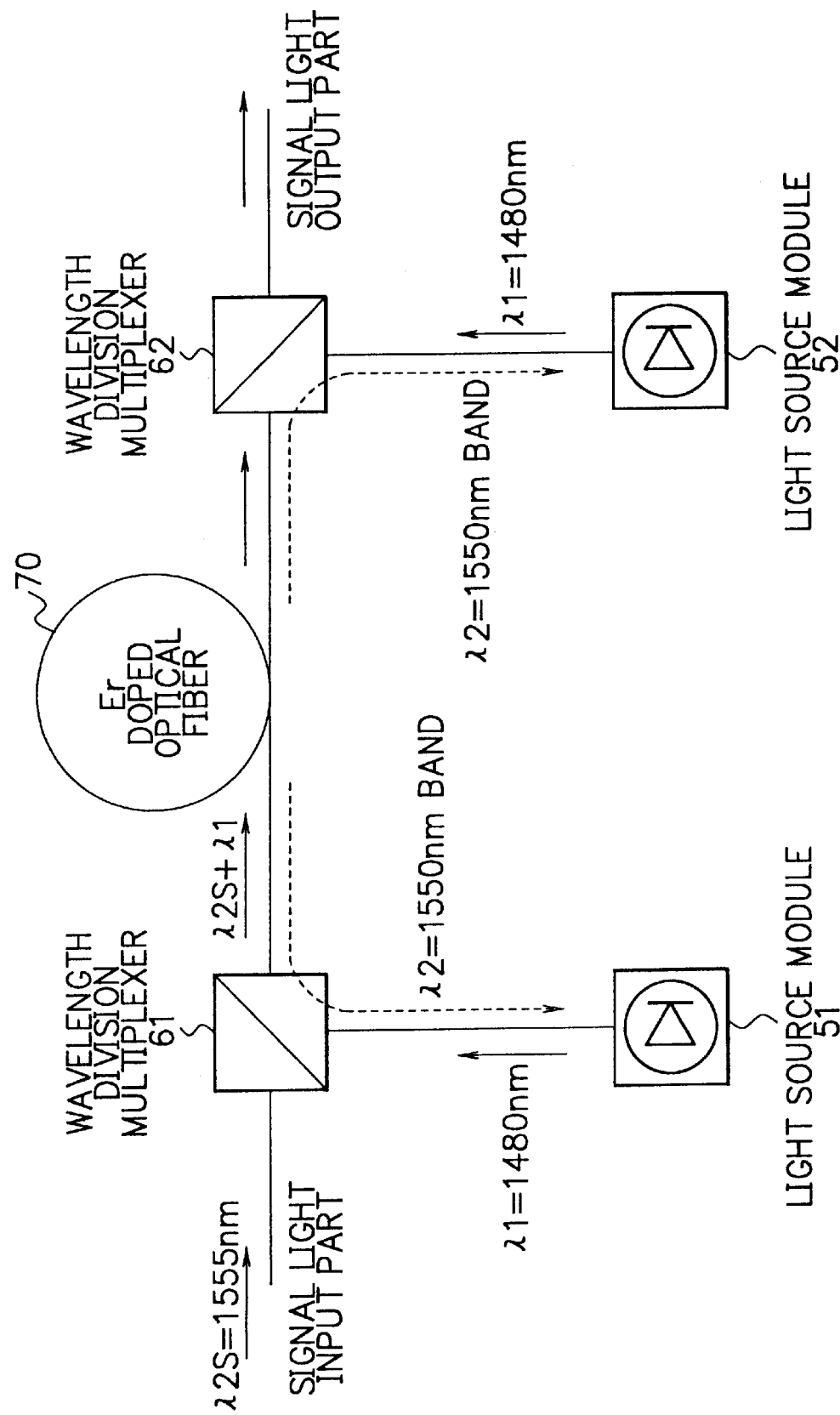
FIG. 3 is a structural diagram applying the light source module shown in FIG. 2 for an optical amplifier of the rare-earth doped optical fiber.

Referring now to FIGS. 2 and 3, the light source modules, as shown in FIG. 2, are represented by light source modules 51 and 52. Wavelength $\lambda$ 2S of 1555 nm is used as the signal light to be amplified, and an Er (erbium) doped optical fiber is used as the rare-earth doped optical fiber. Wavelength $\lambda$ 1 of the pumping light is 1480 nm. The wavelength $\lambda$ 1 of the light source element 1 (as represented in FIG. 2) of both light source modules 51 and 52 is set to 1480 nm.

The signal light to be amplified, having a wavelength $\lambda$ 2S of 1555 nm, and the pumping light from light source module 51 are multiplexed at a WDM (wavelength division multiplexer) 61, and transmitted to the Er doped optical fiber 70. The pumping light from the light source module 52 is transmitted to the Er doped optical fiber 70 via a WDM 62. Inside the Er doped optical fiber 70, the signal light of the wavelength $\lambda$ 2S is amplified and output by using the energy of the pumping light of the wavelength $\lambda$ 1 from the light source modules 51 and 52.

At the same time, ASE (amplitude spontaneous emission) light of the wavelength $\lambda$ 2S of 1550 nm is generated inside of the Er doped optical fiber 70, and is input into light source modules 51 and 52. When this ASE light is reflected in the light source modules 51 and 52 and is input into the Er doped optical fiber 70 again, optical oscillation occurs inside the Er doped optical fiber 70.

However, as shown in FIG. 2, the ASE light of the wavelength $\lambda$ 2S=1555 nm coming from light source modules 51 and 52, is reflected by the optical filter film 6 situated on the end face of the optical fiber 3, and is emitted from optical fiber 3 without being input into the Er doped optical fiber 70 (FIG. 3) a second time. In this manner, optical oscillation inside the Er doped optical fiber is avoided.

A semiconductor laser element outputting light of the wavelength of 980 nm, the pumping wavelength of the Er doped optical fiber, can also be used as light source element 1. In this case, the end face of optical fiber 3 is coated with optical filter film 6, through which the light of wavelength 980 nm transmits and the light of wavelength 1550 nm reflects.

Moreover, a semiconductor laser element outputting light of the wavelength of 1016 nm, the pumping wavelength of the Pr (praseodymium) doped optical fiber, can also be used for the light source element 1. In this case, the end face of optical fiber 3 is coated with optical filter film 6, through which the light of wavelength 1016 nm band transmits and the light of wavelength 1300 nm reflects.

In FIG. 3, light source modules 51 and 52 are situated at both the input and output ends of the Er doped optical fiber 70, and both a forward pumping system and a backward pumping system are applied. However, it is possible to use either the forward pumping system and the backward pumping system by themselves. The slant of the end face of optical fiber 3 is set to be the angle needed to cause the reflected light to be emitted from the optical fiber. Because this angle is different for different kinds of optical fibers, for the purposes of describing the present invention, the angle is specified as only the angle necessary to achieve emission of the reflected light from core 4.

The main advantage of the present invention is the achievement of a stable optical amplification. The light of different wavelengths from the wavelength of the light source inputted to the optical fiber is reliably reflected, and is prevented from being input into the rare-earth doped optical fiber again, a step which can cause optical oscillation and destabilization of the amplification process.

The present invention eliminates the need for optical elements such as an optical filter or optical isolator between the optical fiber and the light source element. Further, the present invention simplifies the entire optical system and allows the optical amplifier to use a light source module having a smaller size and a lower cost.

While the present invention has been described with reference to the particular illustrated embodiments, it should be restricted only by the scope of the appended claims, and not by those illustrated embodiments. A person of ordinary skill in the art can change or modify the particular illustrated embodiments without departing from the scope and spirit of the present invention.

What is claimed is:

1. A light source module, comprising:

a light source element which outputs the light of the pumping wavelength of a rare-earth doped optical fiber;

an optical fiber whose one end face receiving the outputted light from said light source element is shaped into a slant; and an optical filter film which makes the outputted light from said light source element provided at said one end face of said optical fiber penetrate and makes the light of the amplification band wavelength of said rare-earth doped optical fiber reflect.

2. A light source module in accordance with claim 1, wherein said rare-earth doped optical fiber is an Er (erbium) doped optical fiber, said pumping wavelength is 1480 nm band and said amplification band wavelength is 1550 nm band.

3. A light source module in accordance with claim 1, wherein said rare-earth doped optical fiber is an Er doped optical fiber, said pumping wavelength is 980 nm band and said amplification band wavelength is 1550 nm band.

4. A light source module in accordance with claim 1, wherein said rare-earth doped optical fiber is a Pr (praseodymium) doped optical fiber, said pumping wavelength is 1016 nm band and said amplification band wavelength is 1300 nm band.

5. An optical amplifier which supplies the pumping light to a rare-earth doped optical fiber and amplifies an inputted signal light, comprising:

a light source element which outputs the light of the pumping wavelength of said rare-earth doped optical fiber;

an optical fiber for pumping whose one end face receiving the outputted light from said light source element is shaped into a slant;

an optical filter film which makes the outputted light from said light source element provided at said one end face of said optical fiber for pumping penetrate and makes the light of the wavelength of said inputted signal light reflect; and an optical coupler which transmits the pumping light from the other end face of said optical fiber for pumping to said rare-earth doped optical fiber.

6. An optical amplifier in accordance with claim 5, wherein said optical coupler is provided at the input end of said rare-earth doped optical fiber and is constituted to multiplex said inputted signal light and said pumping light.

7. An optical amplifier in accordance with claim 5, wherein said optical coupler is provided at the output end of said rare-earth doped optical fiber and is constituted to separate said inputted signal light and said pumping light.

8. An optical amplifier in accordance with claim 6, wherein said optical coupler is provided at the output end of said rare-earth doped optical fiber and is constituted to separate said inputted signal light and said pumping light.

9. The light source module of claim 1, wherein the oscillation of the amplified band wavelength inside said rare-earth doped optical fiber is prevented.

10. The light source module of claim 1, wherein said slant of said one end face of said optical fiber and said optical filter film produce a non-reflection terminal.

11. The light source module of claim 5, wherein the oscillation of the amplified band wavelength inside of rare-earth doped optical fiber is prevented.

12. The light source module of claim 5, wherein said slant of one end face of said optical fiber and said optical filter film produce a non-reflection terminal.

* * * * *